July 5, 1938.  S. J. NORDSTROM  2,122,721

METER COCK

Filed May 22, 1936

INVENTOR.
Sven J. Nordstrom
BY Strauch & Hoffman
ATTORNEYS

Patented July 5, 1938

2,122,721

UNITED STATES PATENT OFFICE 2,122,721

METER COCK

Sven J. Nordstrom, Piedmont, Calif., assignor to Merco Nordstrom Valve Company, Pittsburgh, Pa., a corporation of Delaware Application May 22, 1936, Serial No. 81,292

4 Claims. (Cl. 251—93)

This invention relates to plug valves, particularly to the type known as meter cocks.

Practically every gas meter installed in the home of the consumer has a plug cock just ahead of the meter so that the supply of gas to the meter can be shut off when desired. This valve is rarely operated, and a disadvantage heretofore experienced with this type of valve is that the tapered plug thereof may become stuck or frozen in its seat during long periods of disuse due to corrosion, and it becomes exceedingly difficult to operate the valve. Consequently when it is desired to turn this valve the plug must be released in some manner, and the usual way is to strike the small end of the plug a hammer blow to unseat the plug. The separation of the plug from its seat thus accomplished permits dangerous leakage of gas, and after the plug is turned, it is usually necessary to reseat the plug by a hammer blow in order to deform the metal seat and prevent leakage past the plug. This is the common and usual mode of handling meter cocks, and a meter cock must be designed to bear this abuse.

According to the present invention, I provide a lubricated plug cock wherein a lubricant chamber at the larger end of the valve is closed by a cap so that the plug cannot be hammered into its seat but can be forced into its seat by lubricant pressure, while the smaller end of the plug is exposed so that it may be struck a hammer blow to release the plug for turning. A spring at the larger end of the plug which abuts the cap then automatically reseats the plug on its lubricated seat. A dead end lubricating system out of communication with the line passage is provided in the seating surface of the plug and casing to assist in the distribution of lubricant and so that lubricant cannot escape from the system when the plug is seated, and in the preferred form this system provides a substantially complete seal around the port in the plug in closed position of the valve so that it is not necessary to turn the valve to distribute the lubricant over the seating surface. I employ the cap closing the seat as the lubricant applicator, and for this purpose provide parallel threads on the cap and casing so that the cap may have a relatively large axial movement into and out of the lubricant chamber. The spring abuts the larger end of the plug against the cap, and therefore the cap may also be used to adjust the seating pressure of the spring on the plug. After the plug has been released for turning it may be forcibly wedged into its seat by turning in the lubricant applicator, thus exerting a steady hydraulic pressure on the plug to seat the same in place of the usual destructive hammer blow heretofore used for this purpose.

Accordingly, it is an object of the present invention to provide a plug valve having means for automatically injecting lubricant between the plug and its seat when the valve is mechanically jacked or separated from its seat.

A further object is the provision of a plug valve having the larger end of the valve closed so that the plug cannot be forcibly hammered into its seat, and having means for wedging the plug into its seat by the application of lubricant pressure.

A further object is the provision of a plug valve which may be cheaply manufactured in small sizes for relatively low pressures, and which will provide an effective closure means for a pipe line.

These and other objects will be apparent from a consideration of the following specification taken in connection with the accompanying drawing wherein.

Figure 1:
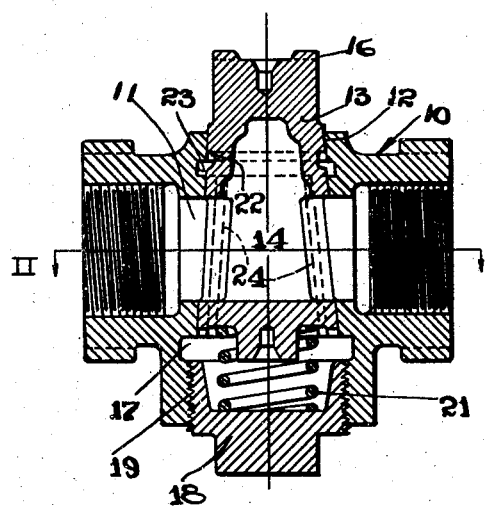
Figure 1 is a vertical sectional view of a preferred embodiment of my invention.
Figure 2:
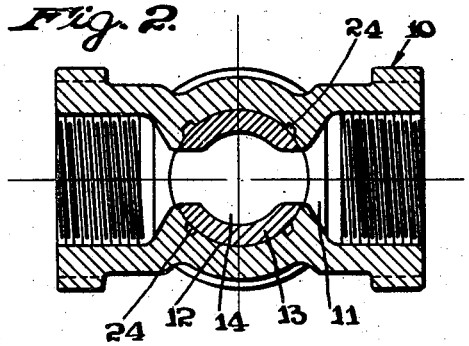
Figure 2 is a horizontal section taken on line II—II of Figure 1.

Referring first to that form of the invention illustrated in Figures 1 and 2, the valve shown therein consists of a casing 10, made of suitable material such as cast iron, which is provided with a longitudinal passageway 11 for flow of fluid. Formed within casing 10 and disposed transversely of the longitudinal passage 11, there is a tapered valve seat 12 and a tapered plug 13 is rotatably disposed within the valve seat 12, and is provided with a port 14 therethrough adapted to register with passage 11 for open position of the valve. To facilitate opening and closing of the valve, a flattened external end portion 16 (Figure 6) is shown formed upon the smaller end of the plug, and is adapted to be engaged by an operating lever or wrench.

At the large end of the plug, the casing is formed to provide a chamber 17, which is adapted to receive a suitable viscous lubricant, one wall of chamber 17 being formed by a threaded cover or cap 18 threaded into a hole 19 in the casing at the larger end of the seat. These threads are on a cylindrical surface, and are not tapered as in the conventional pipe threads, so that by turning this cover, it can be advanced for a substantial distance into the chamber 17 toward the large end of plug 13 so as to serve as a pressure applicator for the lubricant in chamber 17, or it can be retracted until entirely removed from the opening 19 to enable refilling of the chamber 17 with lubricant. The threads should have a fairly close fit, so that substantially no leakage of lubricant or line fluid will occur between the threads, the lubricant thus acting as a plastic seal for the threads. A compression spring 21 is seated against the larger end of the plug 13 and abuts the cover 18 so as to provide yieldable means for urging the plug 13 on its seat.

The lubricant groove system for the seating surface of the plug and casing comprises a circumferential groove 22 in the periphery of the plug adjacent its smaller end, and an adjacent overlapping circumferential groove 23 in the valve seat, and four longitudinal grooves 24 are formed in the seating surface 12 of the valve, the upper ends of these grooves communicating with circumferential groove 23, and their lower ends communicating with chamber 17. This system is blind, that is, when the valve is in closed or open position there is no outlet for lubricant under pressure in the grooves or lubricant chamber, so that the lubricant therein remains under pressure for a long time.

For the purpose of explaining the mode of operation of this valve, it is assumed that the valve plug is in open position and chamber 17 is filled with a suitable viscous lubricant. If the operator wishes to insure that the plug is seated tightly against leakage, the pressure applicator 18 is turned to advance the same inwardly toward the large end of the plug, thus building up within chamber 17 a high lubricant pressure which urges the plug into its seat with a steady powerful pressure. This lubricant under pressure also seals the threads between the cover and casing so that line fluid will not leak therethrough. The lubricant also fills up the lubricant grooves in the valve seat, and as they have no outlet, the pressure therein is always higher than line pressure and is maintained for a long period of time if the valve is not operated. Thus the lubricant under pressure in the grooves provides a high pressure seal which prevents line fluid from leaking past the plug, or from leaking to the exterior at the smaller end of the plug.

If it is desired to close the valve, the plug may be struck a blow with the hammer or other suitable instrument on its smaller end, whereby the larger end of the plug is forced into the lubricant chamber 17 at the same time that the plug is separated from its seat thereby building up a pressure that injects a charge of lubricant over the seating surfaces of the plug and casing from the chamber 17 and from the lubricant grooves 24, 22 and 23. The action of spring 21 immediately reseats the plug on this film of lubricant, the spring being strong enough to overcome any lifting effect of line fluid. There is thus no opportunity for leakage when the plug is raised from its seat. If for any reason the plug is stuck so tightly that it cannot be released by a hammer blow in this manner, the applicator 18 may be retracted thereby relieving the lubricant pressure which holds the plug into its seat, and the valve plug then can be easily released by a hammer blow.

The valve is relubricated by removing the cap 18 and inserting a charge of lubricant into chamber 17. Because of the substantial extent of travel afforded by the pressure applicator 18, it is evident that a single charge of lubricant in chamber 17 will last for a relatively long period of service. Likewise because of the large diameter of the applicator, no undue amount of turning is required for compressing the lubricant, and it is also possible to remove the valve plug through one side of the casing merely by removing the pressure applicator. When after a long period of service, pressure applicator 18 has been advanced to the limit of its movement toward the large end of plug 13, chamber 17 can be packed with a fresh charge of lubricant, merely by removing the pressure applicator from the casing.

It will be noted that spring 21 is compressed to a greater degree as the applicator 18 is advanced. This is a desirable feature because over a long period of service, as the lubricant is consumed, the remaining charge tends to harden with age and a greater effective spring force is required to properly reseat the plug.

Figure 3:
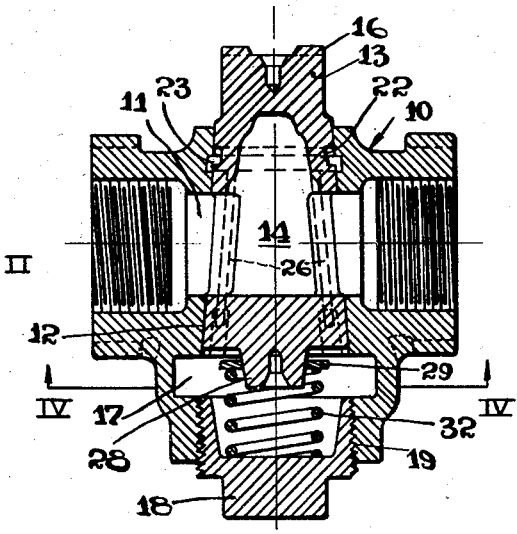
Figure 3 is a vertical sectional view of a modification.
Figure 4:
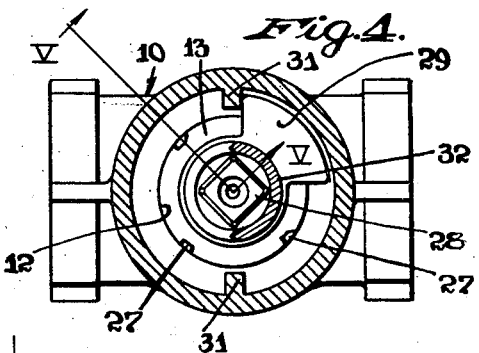
Figure 4 is a horizontal section taken on line IV—IV of Figure 3.
Figures 5, 6:
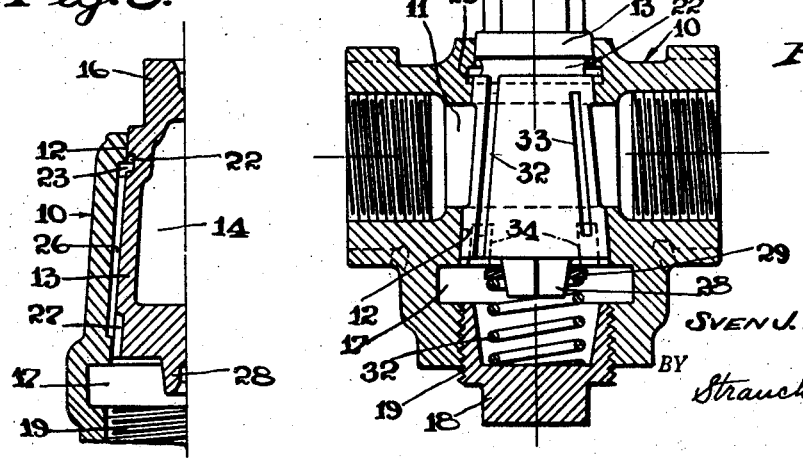
Figure 5 is a section taken on line V—V of Figure 4.
Figure 6 is a vertical section of a further modification.

In the modification shown in Figures 3, 4 and 5, the longitudinal lubricant channels which are exposed to line fluid when the plug is in partly open position are disconnected from the lubricant chamber 17 so that the plug may be forced into its seat by lubricant pressure, or may be automatically lubricated when the plug is unseated in all positions of the plug. In this modification four longitudinal grooves 26 are provided which are connected to the circumferential groove 23, and terminate short of the larger end of the valve seat 12. The plug has four short or dwarf longitudinal grooves 27 so located that in the full opened and full closed positions the short grooves 27 are in communication with the longitudinal grooves 26, and thus connect the longitudinal grooves 26 with the lubricant chamber 17. In intermediate position of the valve plug the short grooves 27 are out of communication with the longitudinal grooves 26, and therefore in this position it is possible to develop lubricant pressure in the chamber 17 against the larger end of the plug to seat the plug, and it is possible to automatically lubricate the plug by unseating the plug with a hammer blow on its smaller end as previously described.

In this modification it is preferred to utilize a stop to prevent the plug from being turned to an angle of more than 90°, and for this purpose the larger end of the plug has a squared tapered lug 28 which receives a flat plate 29 having a square aperture therein to accommodate the lug 28. The valve casing has inwardly projecting lugs 31 in the chamber 17 which encounter the plate 29 and thereby limit turning of the valve to an angle of 90°. The compression spring 32 in this modification abuts the applicator 18 at one end and bears against the one face of the plate 29 at its opposite end thereby retaining the plate 29 in position and also yieldingly urging the plug into its seat.

In the modification shown in Figure 6, the lubricant groove arrangement is such that a distribution of lubricant is obtained through the grooves when the valve is in intermediate position, the grooves exposed to line fluid in this position being disconnected from the lubricant chamber. The plug 13 has two diametrically opposite longitudinal lubricant grooves 32 which are connected at the smaller end with the circumferential groove 22, and at the larger end of the plug connect with the lubricant chamber 17. On the other side of the port in the plug there are two longitudinal grooves 33 which do not connect with the circumferential groove 22, and which terminate short of the larger end of the plug. When the valve is in open position the longitudinal grooves 33 are connected to the lubricant chamber 17 by two dwarf longitudinal grooves 34 in the valve casing. In Figure 6 one of these grooves 34 is shown in dot and dash lines to indicate its position in the cut-away portion of the casing. The arrangement of the stop 29 and cooperating lugs on the casing is such that the valve as shown in Figure 6 would be turned counterclockwise as viewed from the larger end to close the valve, and in so closing the groove 33 would be exposed to the line fluid. However, in this position the groove 33 is disconnected from the lubricant chamber. The groove 32 being always connected to the lubricant chamber, when the valve plug is released from its seat, as previously described, lubricant is injected between the plug and its seat from the grooves 32 as well as from the chamber 17 and dwarf grooves 34.

This application is a continuation in part of my copending application Serial No. 618,624 entitled "Plug valve" filed on June 22, 1932.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve for controlling the flow of fluid, a casing having a line passage for fluid and having a tapered seat formed therein, a tapered plug having a port therein arranged to form a continuation of the line passage and rotatably mounted within said seat and capable of axial movement from and to said seat, resilient means for holding said plug against said seat, a dead end lubricating system out of communication with the line passage and comprising a chamber in said casing at the larger end of the plug adapted to receive viscous lubricant and communicating with dead end lubricant channels interrupting the seating surface of the plug and casing whereby lubricant is prevented from escaping from the system when the plug is seated, said lubricant system substantially surrounding the port on at least one side of the transverse axis in closed or open position of the valve, means to develop lubricant pressure in the chamber to force said plug into said seat and force lubricant under pressure to the grooves in the seating surface to form a seal, said means and chamber cooperating with said dead end lubricating system to maintain lubricant pressure in said chamber for a substantial period of time to maintain said plug in seated position.

2. In a plug valve for controlling the flow of fluid, a casing having a line passage for fluid and having a tapered seat formed therein, a tapered plug having a port therein arranged to form a continuation of the line passage and rotatably mounted within said seat and capable of axial movement from and to said seat, resilient means for holding said plug against said seat, a dead end lubricating system out of communication with the line passage and comprising a chamber in said casing at the larger end of the plug adapted to receive viscous lubricant, a circumferential lubricant groove adjacent the smaller end of the plug, and longitudinal lubricant channels on each side of the transverse axis interrupting the seating surface of the plug and casing and communicating with said circumferential groove and lubricant chamber to surround the port in closed or open position of the valve whereby lubricant is prevented from escaping from the system when the plug is seated, an adjustable substantially cylindrical pressure applicator threaded into the casing to close said chamber and capable of extensive axial movement, whereby advancing said pressure applicator into the chamber develops lubricant pressure in the chamber to force said plug into said seat and forces lubricant under pressure to the grooves in the seating surface to form a seal, said applicator and chamber cooperating with said dead end lubricating system to maintain lubricant pressure in said chamber for a substantial period of time to maintain said plug in seated position.

3. In a plug valve for controlling the flow of fluid, a casing having a line passage for fluid and having a tapered seat formed therein, a tapered plug having a port therein arranged to form a continuation of the line passage and rotatably mounted within said seat and capable of axial movement from and to said seat, resilient means for holding said plug against said seat, a dead end lubricating system out of communication with the line passage and comprising a chamber in said casing at the larger end of the plug adapted to receive viscous lubricant, pairs of longitudinal lubricant channels on one side of the transverse axis of the valve interrupting the seating surface of the plug and casing, and communicating channels connecting the longitudinal channels with the chamber in closed and open positions only whereby lubricant is prevented from escaping from the system when the plug is seated, an adjustable substantially cylindrical pressure applicator threaded into the casing to close said chamber and capable of extensive axial movement, whereby advancing said pressure applicator into the chamber develops lubricant pressure in the chamber to force said plug into said seat and forces lubricant under pressure to the grooves in the seating surface to form a seal, said applicator and chamber cooperating with said dead end lubricating system to maintain lubricant pressure in said chamber for a substantial period of time to maintain said plug in seated position.

4. In a plug valve for controlling the flow of fluid, a casing having a line passage for fluid and having a tapered seat formed therein, a tapered plug having a port therein arranged to form a continuation of the line passage and rotatably mounted within said seat and capable of axial movement from and to said seat, resilient means for holding said plug against said seat, a dead end lubricating system out of communication with the line passage and comprising a chamber in said casing at the larger end of the plug adapted to receive viscous lubricant, a circumferential lubricant groove adjacent the smaller end of the plug, and a pair of longitudinal lubricant channels on each side of the transverse axis of the valve interrupting the seating surface of the plug and casing, one of said longitudinal channels of each pair connecting with said circumferential channel and said chamber, and the other channel terminating short of the circumferential groove and chamber, and communicating channels connecting said shorter longitudinal channel with the chamber in full open and full closed positions of said valve, whereby lubricant is prevented from escaping from the system when the plug is seated, an adjustable substantially cylindrical pressure applicator threaded into the casing to close said chamber and capable of extensive axial movement, whereby advancing said pressure applicator into the chamber develops lubricant pressure in the chamber to force said plug into said seat and forces lubricant under pressure to the grooves in the seating surface to form a seal, said applicator and chamber cooperating with said dead end lubricating system to maintain lubricant pressure in said chamber for a substantial period of time to maintain said plug in seated position.

SVEN J. NORDSTROM.